United States Patent [19]

Eitzinger

[11] Patent Number: 4,520,682

[45] Date of Patent: Jun. 4, 1985

[54] RECIPROCATING RECTILINEAR MOTION APPARATUS

[75] Inventor: Robert Eitzinger, Wheeling, Ill.

[73] Assignee: Mid-West Automation Inc., Wheeling, Ill.

[21] Appl. No.: 316,084

[22] Filed: Oct. 29, 1981

[51] Int. Cl.³ .................. F16H 21/32; F16H 21/18
[52] U.S. Cl. ............................. 74/40; 74/43; 74/833; 74/103
[58] Field of Search ........... 74/40, 42, 43, 96, 103, 74/833

[56] References Cited

U.S. PATENT DOCUMENTS

| 2,900,830 | 8/1959 | Eisenburger | 74/103 |
| 3,748,914 | 7/1973 | Parsons | 74/42 |
| 3,974,706 | 8/1976 | Danko | 74/89.15 |

Primary Examiner—Lawrence J. Staab

[57] ABSTRACT

A mechanism for converting rotary drive motion into reciprocal rectilinear motion including structure for varying the length of the rectilinear stroke.

1 Claim, 2 Drawing Figures

RECIPROCATING RECTILINEAR MOTION APPARATUS

SUMMARY OF THE INVENTION

In many instances there is required an apparatus for producing a reciprocal rectilinear motion resulting from a rotary drive mechanism. In the instant environment, the mechanism has been employed with a draw clamp for pulling a plurality of horizontally aligned strands of wire through a linear path. The length of the drawn strands of wire may vary according to application, and, therefore, it is required that the reciprocal rectilinear movement of the mechanism be adjustable to accommodate this requirement.

The mechanism has a power source which results in a rotational drive motion for the mechanism. Through a series of pivotal plates and a pantograph formed from a series of interconnected links the rotary motion is transformed into a reciprocating rectilinear stroke.

DETAILED DESCRIPTION OF THE DRAWINGS

The invention will be best understood by reference to the accompanying drawings which disclose the preferred mode of construction by which the stated objects of the invention are achieved, and, in which.

GENERAL DESCRIPTION

Figure 1:
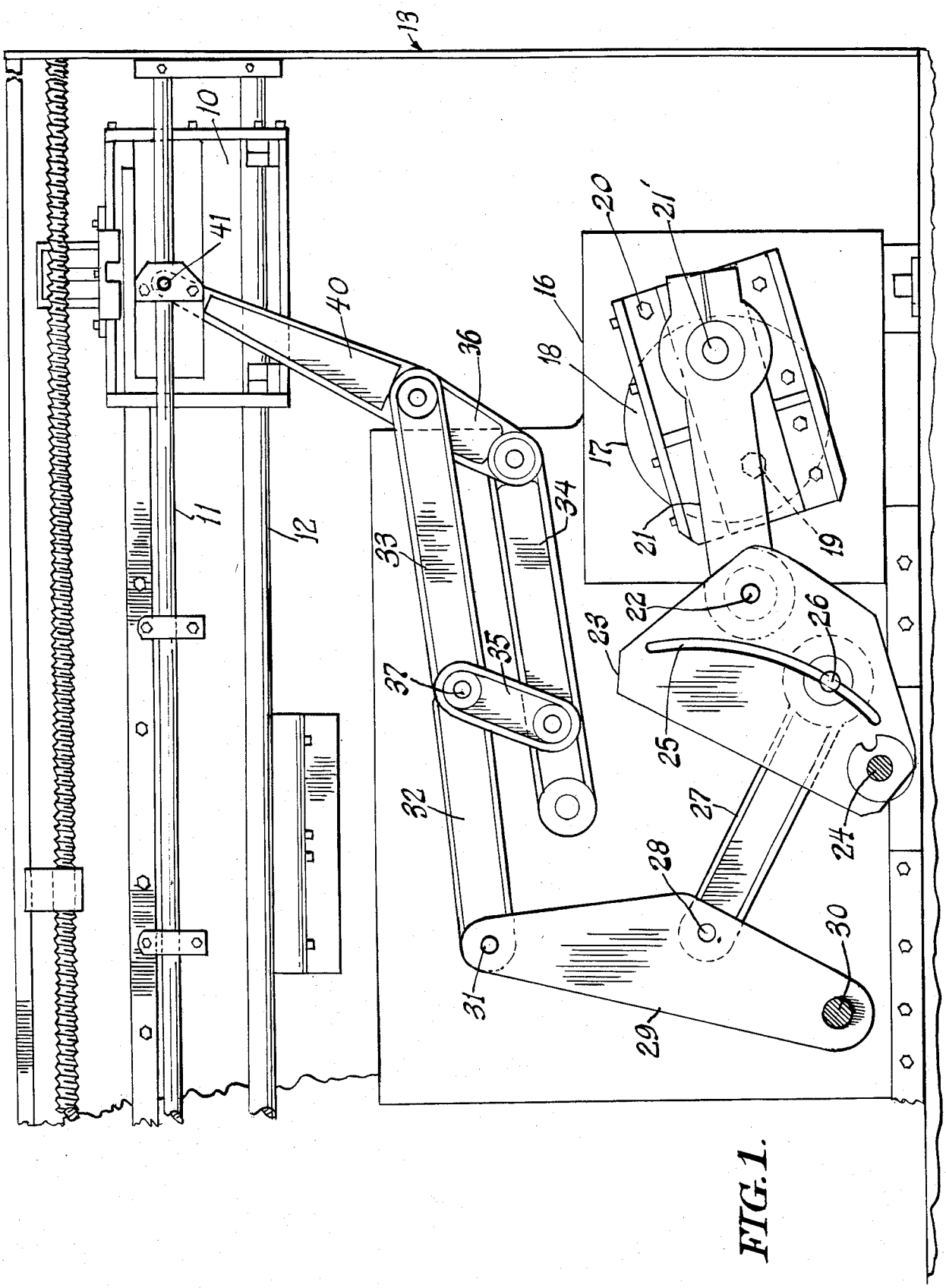
FIG. 1 is a side elevational view of the mechanism in its original or starting position.
Figure 2:
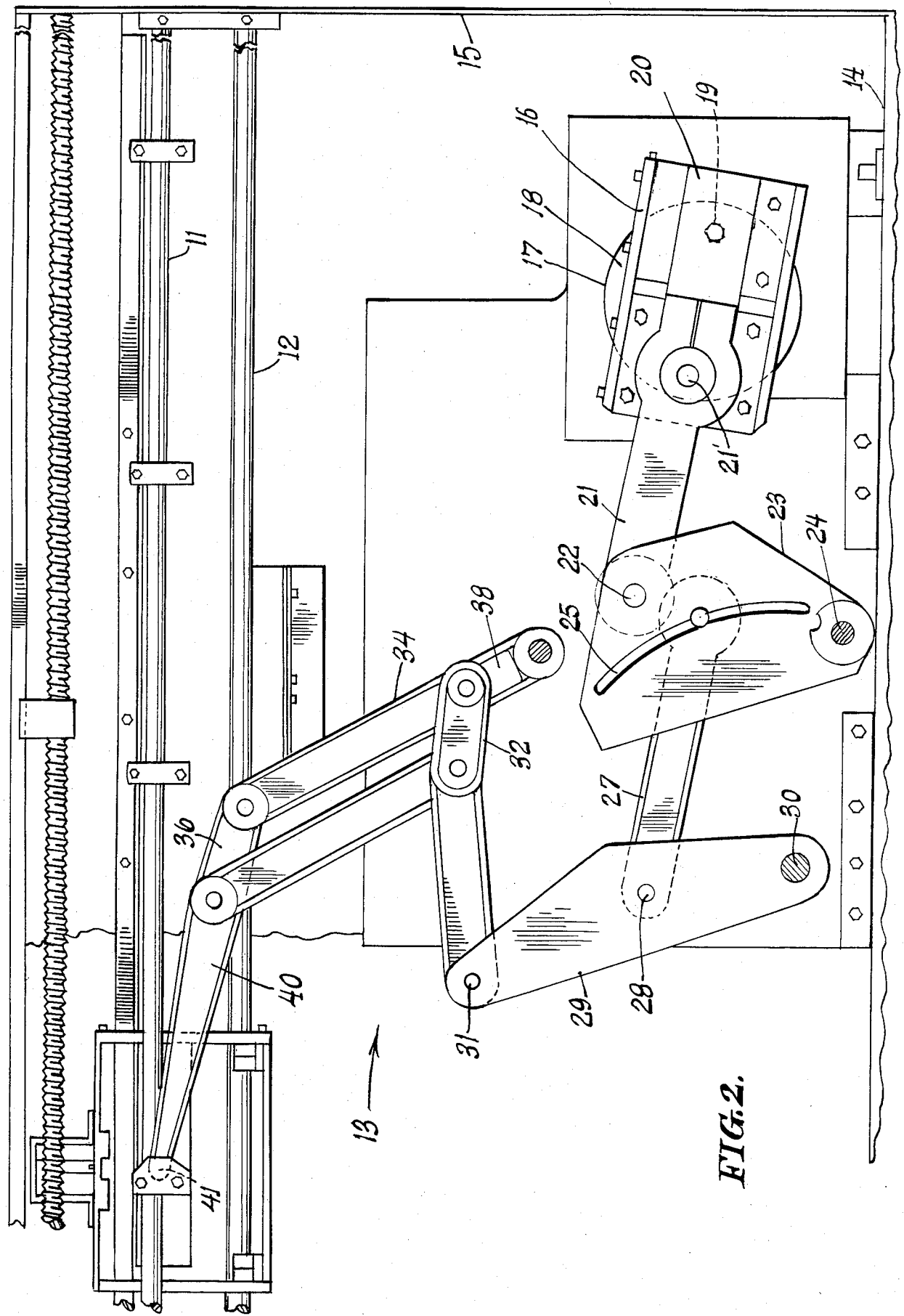
FIG. 2 is a side elevational view of the mechanism in an adjusted stroke position.

The object of the invention, illustrated in the drawings, is to reciprocally move a slide 10 on a pair of vertically aligned, horizontally extending, guide rods 11 and 12 through a reciprocal rectilinear stroke.

The mechanism of the invention is contained within a framework 13 providing a base 14 and end walls 15 (only one of which is shown).

Within the frame 13 and mounted upon the base 14 is a vertically extending retaining plate 16 provided with a circular opening 17. Positioned within the opening 17 is a circular drive disc 18 which is adapted to be rotated by a power source such as an electric motor, not shown.

Pivotally mounted by a pivot pin 19 (shown in dotted lines) to the drive disc 18 along a radius thereof so as to be off-set of the center thereof is a drive crank 20.

Pivotally mounted upon a pin 21' is one end of a drive arm 21. The opposite end of the drive arm 21 is pivotally connected as at 22 to an adjustment plate 23. The adjustment plate 23 is pivoted on a pin 24, and, as such, is adapted to be pivoted about the pin 24 under the driving force of the drive arm 21. An elongated curved slot 25 is formed in the adjustment plate 23. By a suitable adjustable connector 26 the free end of a pivot arm 27 is connected to the adjustment plate 23 through the slot 25. The connector 26 is such that the pivot arm 27 may be fixedly connected to the adjustment plate 23 at any point throughout the length of the slot 25, this for a purpose hereinafter made apparent.

The pivot arm 27 is in turn pivotally connected, as at 28, to the stroke arm 29. The stroke arm 29 has one end pivotally connected by pivot pin 30 to an interior supporting wall. The opposite end of the stroke arm 29 has pivotally connected thereto, as at 31, one end of a drive link 32.

A pantograph is formed by the parallellogram consisting of a pair of parallel long links 33 and 34, and a pair of short links 35 and 36. The drive link 32 has its free end pivotally connected, as at 37, at the point of pivotal connection between the long link 33 and the short link 35. An extension 38 of the long link 34 is pivotally connected, as at 39, to the interior supporting wall. By an extension comprising a tow arm 40, the short link 36 of the pantograph is operatively connected to the slide 10 at a pivotal point 41.

In operation, when the drive arm 21 has its pivot pin 31 moved through an orbital path, the arm 21 will effect simultaneous rocking of the adjustment plate 23, and the stroke arm 29, through the connection therebetween provided by the pivot arm 27.

The movement of the stroke arm 29 will be transmitted through the drive link 32 which, in turn, will effect movement of the pantograph comprised of the links 33, 34, 35, and 36, about the pivot pin 39. This movement will cause the tow arm 40 to drive the slide 10 over the supporting rods 11 and 12 through a linear path.

The length of the stroke of linear movement of the slide 10 can be varied by changing the position of the connector 26 at any point throughout the length of the slot 25. By the adjustment of this connection the length of travel of the free end of the stroke arm 29 is controlled and it in turn, through the pantograph heretofore described, will control the length of the stroke of the slide 10.

From the foregoing it is apparent that I have provided a means for converting rotational drive into reciprocating rectilinear motion. It is also apparent that I have provided a simple, yet novel, means of adjusting the length of the end stroke of the reciprocal rectilinear motion through the single manipulation of the connection between the adjusting plate 23 and the stroke arm 29.

While I have illustrated and described the preferred form of construction for carrying my invention into effect, this is capable of variation and modification without departing from the spirit of the invention. I, therefore, do not wish to be limited to the precise details of construction as set forth, but desire to avail myself of such variations and modifications as come within the scope of the appended claims.

Having thus described the invention, what I claim as new and desire to protect by Letters Patent is:

1. A mechanism for converting rotational drive motion into reciprocal rectilinear motion, comprising:
    (a) a drive crank, one end of which is pivotally connected to a rotating drive source,
    (b) a drive arm, one end of which is pivotally connected to the opposite end of said drive crank so as to be moved through an orbital path about the pivotal connection with a resulting circular movement through a vertical plane to the opposite end of said drive arm,
    (c) a slotted adjustment plate supported by a fixed pivot pin extending in a vertical plane therefrom, with said opposite end of said drive arm connected thereto so as to reciprocally rock said adjustment plate through a vertical plane about said pivot pin,
    (d) a stroke arm pivotally mounted in spaced relation to said adjustment plate and adapted to be reciprocally rocked in unison with said adjustment plate,
    (e) a rocker arm having one end pivotally connected to said stroke arm and with its opposite end adjustably connected throughout the slot of said adjustment plate,
(f) a series of interconnected links forming a pantograph pivotally connected in vertical relation to said stroke arm and said adjustment plate,
(g) a drive link connected to one end of said stroke arm and with its opposite end connected to one of said interconnected links so as to pivot said pantograph through a vertical plane in response to adjusted pivotal movement of said stroke arm,
(h) a tow arm connected to a portion of said pantograph and pivotally connected to a reciprocally movable slide, and
(i) elongated guide means for said slide extending horizontally with respect to the vertical plane of said pantograph, stroke arm and slotted adjustment plate.

* * * * *